United States Patent [19]
Jones et al.

[11] Patent Number: 5,802,586
[45] Date of Patent: Sep. 1, 1998

[54] CACHE MEMORY HAVING A READ-MODIFY-WRITE OPERATION AND SIMULTANEOUS BURST READ AND WRITE OPERATIONS AND A METHOD THEREFOR

[75] Inventors: Kenneth W. Jones; Mark D. Bader; Arthur D. Kahlich, all of Austin, Tex.

[73] Assignee: Motorola, Inc., Schaumburg, Ill.

[21] Appl. No.: 395,225

[22] Filed: Feb. 27, 1995

[51] Int. Cl.$^6$ .................................................. G06F 12/00
[52] U.S. Cl. .................. 711/155; 711/128; 711/133; 711/141; 711/168; 365/189.04; 365/49
[58] Field of Search ................. 365/189.04, 155, 365/49, 194; 395/482, 168, 149, 131, 458; 711/155, 128, 133, 141, 168

[56] References Cited

U.S. PATENT DOCUMENTS

| | | | |
|---|---|---|---|
| 4,740,922 | 4/1988 | Ogawa | 365/189.04 |
| 4,858,111 | 8/1989 | Steps | 711/143 |
| 4,931,999 | 6/1990 | Umeki | 365/230.01 |
| 5,123,097 | 6/1992 | Joyce et al. | 395/394 |
| 5,177,706 | 1/1993 | Shinohara et al. | 365/189.04 |
| 5,265,063 | 11/1993 | Kogure | 365/233 |
| 5,289,431 | 2/1994 | Konishi | 365/230.03 |
| 5,293,603 | 3/1994 | MacWilliams et al. | 395/309 |
| 5,309,395 | 5/1994 | Dickinson et al. | 365/189.04 |
| 5,375,089 | 12/1994 | Lo | 365/189.04 |
| 5,381,363 | 1/1995 | Bazes | 365/51 |
| 5,384,737 | 1/1995 | Childs et al. | 365/189.05 |
| 5,434,818 | 7/1995 | Byers et al. | 365/189.04 |
| 5,473,574 | 12/1995 | Clemen et al. | 365/230.05 |
| 5,479,641 | 12/1995 | Nadir et al. | 711/128 |
| 5,493,536 | 2/1996 | Aoki | 365/230.05 |
| 5,497,347 | 3/1996 | Feng | 365/189.07 |
| 5,590,307 | 12/1996 | McClure | 711/131 |

OTHER PUBLICATIONS

Jim Handy, "The Cache Memory Handbook", Academic Press, 1993, pp. 37–106.
Cypress Semiconductor Corp., "High Performance Data Book", Aug. 1, 1993, pp. 2–235–2–267.

*Primary Examiner*—Eddie P. Chan
*Assistant Examiner*—Hong C. Kim
*Attorney, Agent, or Firm*—Daniel D. Hill

[57] ABSTRACT

A multiple-way, set associative cache memory (20) allows burst read and burst write operations to occur simultaneously on different columns within a memory block during a read-modify-write operation. This is accomplished by using a write column logic (47) and a read column logic (51) to delay write column decode signals by one clock cycle from the read column decode signals. When data is being burst into and out of the cache during the read-modify-write operation, the first read cycle from the cache array (40) occurs, and one clock cycle later, the first write cycle occurs. The first write cycle occurs during the same time interval as the second read cycle. This increases the speed of a read-modify-write operation, relaxes timing constraints on the read and write operations, while reducing the power consumption of the cache.

16 Claims, 3 Drawing Sheets

CACHE MEMORY HAVING A READ-MODIFY-WRITE OPERATION AND SIMULTANEOUS BURST READ AND WRITE OPERATIONS AND A METHOD THEREFOR

FIELD OF THE INVENTION

This invention relates generally to memories, and more particularly, to a cache memory having a read-modify-write operation and a method therefor.

BACKGROUND OF THE INVENTION

A cache is a relatively small, high speed memory that is used to increase the speed of a data processing system. The access time of the cache is about the same as a central processing unit (CPU) logic propagation delay. The cache stores frequently used instructions or data to reduce the number of accesses between the CPU and a relatively slower main memory, thus improving system performance.

A cache typically includes a cache array for storing instructions and/or data, a cache TAG for storing addresses corresponding to data stored in the cache array, a comparator, and a cache controller. The cache array typically includes high speed static random access memory (SRAM) cells. The higher order bits of an address are stored in the cache TAG when the corresponding data or instructions are written to the cache array. In addition, a valid bit is set as a part of the TAG address for qualifying a valid hit of the stored TAG address during a compare cycle of the cache. For example, a logic "one" valid bit indicates that the TAG address is valid, and a logic "zero" valid bit indicates that the TAG address is not valid.

When the cache is provided with an address, the comparator compares the address to a TAG address stored in the cache TAG. If the TAG address and the processor generated address are the same, and the valid bit has been set, a cache "hit" occurs, and a match signal of a predetermined logic state indicates that the requested data is located in the cache array. If the processor generated address and the TAG address are not the same, and/or the valid bit is not set to indicate a valid address, a cache "miss" occurs, and a match signal of an opposite logic state is provided by the cache, indicating that the requested data is not located in the cache memory. When a cache miss occurs, the processor is halted while the necessary information is fetched from an external memory location and written to the cache. The time required to fetch the information from the external memory is a miss penalty time and will delay processing for at least one clock cycle.

Some caches allow data to be modified in the cache without also modifying the data in the main memory. When this occurs, a "dirty bit" may be set, indicating that the data in the cache differs from data in the main memory. In a data processing system having a multiple way set associate cache, when the processor accesses the cache and a miss occurs, if all of the ways have "dirty", or modified, data in them, a dirty line must be read from the cache, and a new line written into its location before the required data can be provided to the processor. This is commonly known as a read-modify-write operation. The cache must first cast out the dirty data and then write the new data in its place. The processor must wait while the read-modify-write operation is accomplished before the requested data can be provided by the cache.

SUMMARY OF THE INVENTION

Accordingly, there is provided, in one form, a cache memory having a plurality of memory cells, a word line decoding circuit, and column decoding logic. The word line decoding circuit is coupled to the plurality of memory cells, and selects a word line in response to an address. The column decoding logic is coupled to the plurality of memory cells, and is for selecting a first memory cell to receive data and a second memory cell to provide data, the column decoding logic selecting the first and second memory cells during a first clock signal. The first data signal is provided to the first selected memory cell and the second data signal is received from the second selected memory cell during a same time interval.

In another embodiment, a method for performing a read-modify-write operation in multiple-way, set associative cache memory is provided. These and other features and advantages will be more clearly understood from the following detailed description taken in conjunction with the accompanying drawings.

DESCRIPTION OF A PREFERRED EMBODIMENT

Generally, the present invention provides a multiple-way, set associative cache that allows read and write operations to occur simultaneously on different columns within a memory block. This is accomplished during a read-modify-write operation by using separate column decoding signals for a read operation and for a write operation, and by delaying the write column decoding signals by one clock cycle from the read column decode signals. When data is being burst into and out of the cache during the read-modify-write operation, the first read cycle from the cache occurs, and one clock cycle later, the first write cycle occurs during the same time interval as the second read cycle. This increases the speed of a read-modify-write operation, and relaxes timing constraints on the read and write operations.

Figure 1:
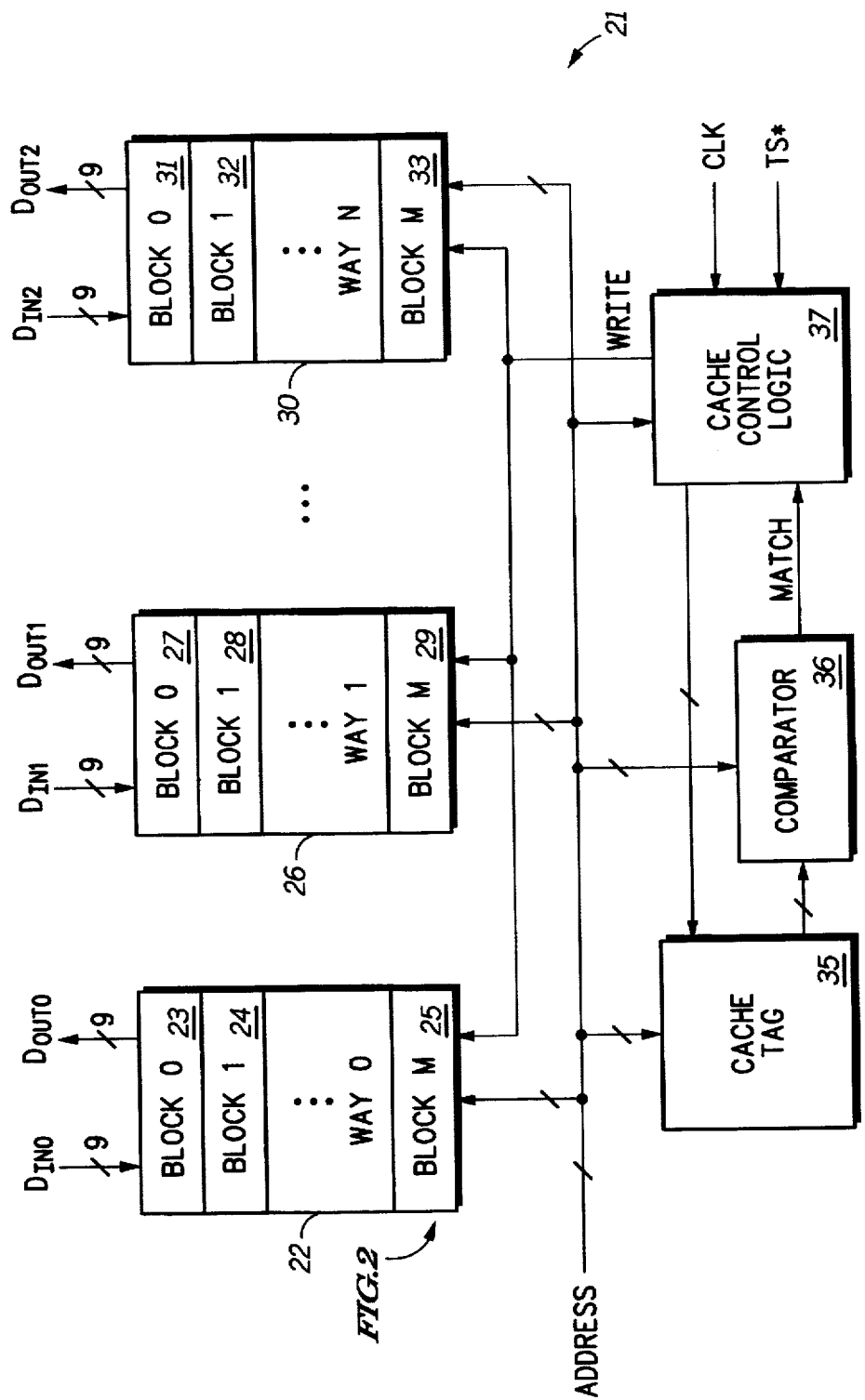
FIG. 1 illustrates, in block diagram form, a cache memory in accordance with one embodiment of the present invention.

The present invention can be more fully described with reference to FIGS. 1–3. FIG. 1 illustrates, in block diagram form, cache memory 20 in accordance with the present invention. In one embodiment, cache memory 20 is an integrated multiple-way set associative cache memory, and includes data cache array 21, cache TAG 35, comparator 36 and cache control logic 37. Data cache array 21 includes a plurality of ways, represented by way 22 labeled "WAY 0", way 26 labeled "WAY 1", and way 30 labeled "WAY N", where N is a positive integer equal to 2 or greater. Each way includes a plurality of blocks of memory cells. Way 22 includes blocks 23, 24, and 25, way 26 includes blocks 27, 28, and 29, and way 30 includes block 31, 32, and 33.

Each way has a first plurality of input terminals for receiving a plurality of address signals labeled "ADDRESS", an input terminal for receiving a write enable signal labeled "WRITE" from cache control logic 37, and a second plurality of input terminals for receiving input data signals labeled "$D_{IN0}$". Way 22 has a plurality of output terminals for providing output data signals labeled "$D_{OUT0}$", and a plurality of input terminals for receiving input data signals labeled "$D_{IN0}$". Way 26 has a plurality of output terminals for providing output data signals labeled "$D_{OUT1}$", and a plurality of input terminals for receiving input data signals labeled "$D_{IN1}$". Way 30 has a plurality of output terminals for providing output data signals labeled "$D_{OUT2}$", and a plurality of input terminals for receiving input data signals labeled "$D_{IN2}$". In general, address signals ADDRESS include a row address portion, a column address portion, and a block/way decode portion. The row address is used to select a particular word line, and the column address is used to select a particular bit line pair. The block/way decode portion selects a memory block in a way. A memory cell located at the intersection of a selected word line and bit line pair may be accessed for either a read cycle or a write cycle.

In the illustrated embodiment, data cache array 21 includes a plurality of static random access memory (SRAM) cells. In other embodiments, data cache array 21 may include any other type of volatile or nonvolatile memory cells, including but not limited to, dynamic random access memory (DRAM) cells, read only memory (ROM) cells, programmable read only memory (PROM) cells, and electrically erasable programmable read only memory (EEPROM) cells.

Cache TAG 35 includes a plurality memory cells for storing a TAG address corresponding to data stored in data cache array 21. Cache TAG 35 has a first plurality of input terminals for receiving a TAG address portion of address signals ADDRESS, a plurality of output terminals, and a second plurality of input terminals for receiving control signals from cache control logic 37. The TAG address portion comprises the higher order bits of address signals ADDRESS. Comparator 36 has a first plurality of input terminals for receiving a stored TAG address from cache TAG 35, a second plurality of input terminals for receiving address signals ADDRESS, and an output terminal for providing a match signal labeled "MATCH". Cache control logic 37 has a first input terminal coupled to the output terminal of comparator 36 for receiving match signal MATCH, a first plurality of output terminals coupled to the second plurality input terminals of cache TAG 35, a second plurality of output terminals coupled to the second plurality of input terminals of each of the ways for providing write enable signal WRITE, a plurality of input terminals for receiving address signals ADDRESS, a second input terminal for receiving a clock signal labeled "CLK", and a third input terminal for receiving a transfer start signal labeled "TS*". Cache control logic 37 also includes burst logic for bursting data during both read and write operations.

Figure 2:
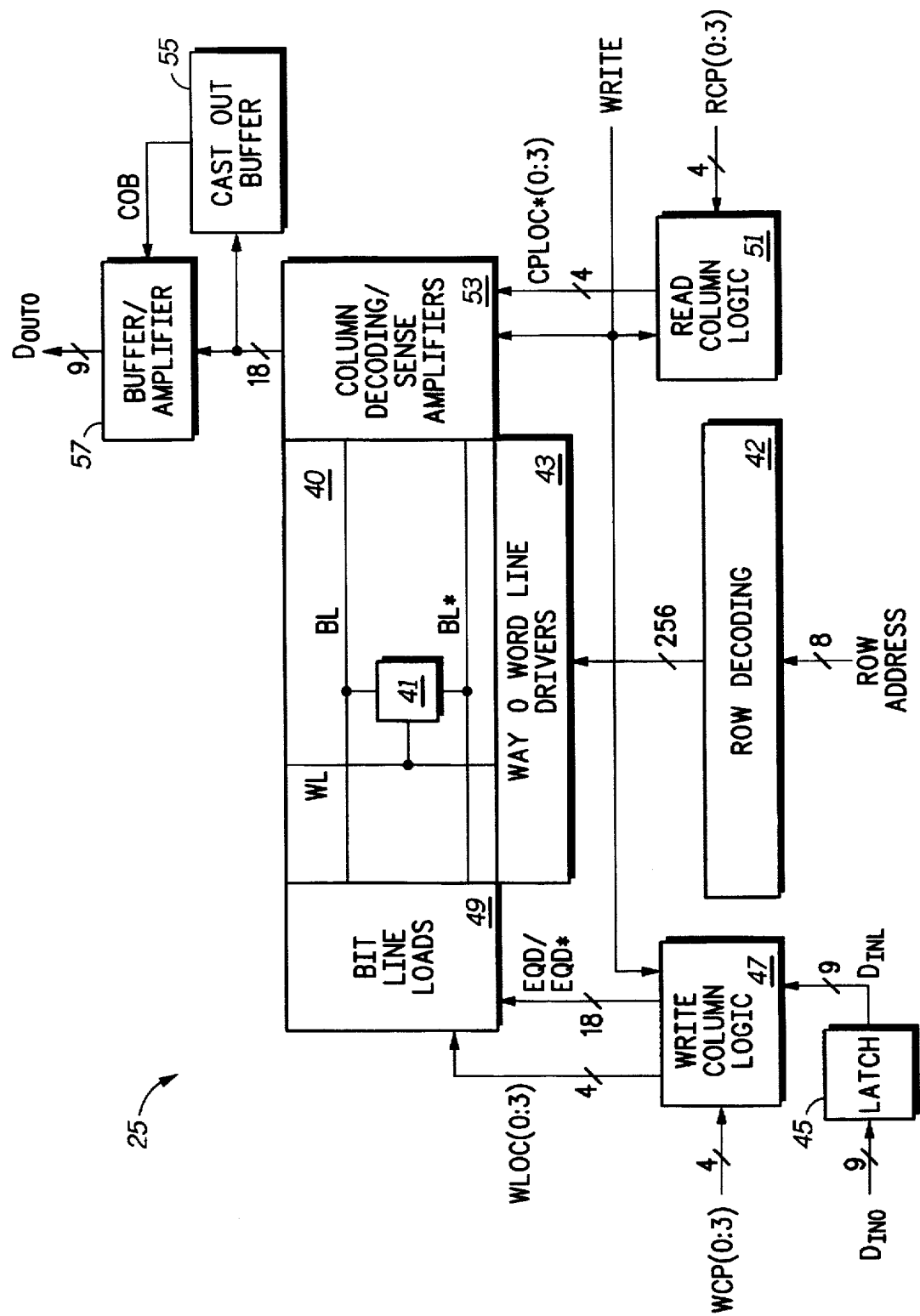
FIG. 2 illustrates, in block diagram form, a portion of the cache memory of FIG. 1.

FIG. 2 illustrates, in block diagram form, a portion of cache memory 20 of FIG. 1 in more detail. The portion of cache memory 20 includes memory block 25. Memory block 25 includes memory array 40, row decoding 42, way 0 word line drivers 43, write column logic 47, bit line loads 49, read column logic 51, and column decoding/sense amplifiers 53. Also illustrated in FIG. 2 are data in latch 45, cast out buffer 55, and data out buffer/amplifier 57 for way 22. Memory array 40 includes a representative memory cell 41 coupled to a word line labeled "WL" and to a bit line pair labeled "BL" and "BL*". Note that an asterisk (*) after a signal name indicates that the signal is a logical complement of a signal having the same name but lacking the asterisk (*).

Data in latch 45 has a plurality of input terminals for receiving a plurality of input data signals $D_{IN0}$, and a plurality output data signals for providing data signals labeled "DINL". Write column logic 47 has a first plurality of input terminals coupled to the plurality of output terminals of data in latch 45, a second plurality of input terminals for receiving write column decode signals labeled "WCP (0:3)", an input terminal for receiving write enable signal WRITE, a first plurality of output terminals for providing differential global data signals labeled "EQD/EQD*", and a plurality of output terminals for providing local write local column decode signals labeled "WLOC(0:3)". Bit line loads 49 has a first plurality of input terminals coupled to the first plurality of output terminals of write column logic 47, and a second plurality of input terminals coupled to the second plurality of output terminals of write column logic 47. There is a bit line load circuit coupled to each bit line pair of memory array 40 including bit line pair BL and BL*.

Row decoding circuit 42 has a plurality of input terminals for receiving a plurality of row address signals labeled "ROW ADDRESS", and a plurality of output terminals. Way 0 word line drivers 43 has a plurality of input terminals coupled to the plurality of output terminals of row decoding 42. Way 0 word line drivers 43 includes a word line driver circuit for each word line in way 22. In the illustrated embodiment, row decoding 42 includes row address predecoding and row select circuits. Note that the amount of row decoding performed by row decoding 42 is not important for describing the invention and may be different in other embodiments.

Read column logic 51 has a plurality of input terminals for receiving read column decode signals labeled "RCP(0:3)", an input terminal for receiving write enable signal WRITE, and a plurality of output terminals for providing local read column decoding signals labeled "CPLOC*(0:3)". Column decoding/sense amplifiers 53 has a plurality of input terminals coupled to the plurality of output terminals of read column logic 51, and a plurality of output terminals. Each bit line pair of memory array 40, including bit line pair BL/BL*, is coupled to shared sense amplifiers by column decoding logic during a read operation of cache memory 20. Data output buffer/amplifier 57 has a first plurality of input terminals coupled to the plurality of output terminals of column decoding/sense amplifiers 53, a plurality of output terminals for providing output data signals $D_{OUT0}$ to a plurality of output data pads (not shown), and a second plurality of input terminals. Cast out buffer 55 has a plurality of input terminals coupled to the output terminals of column decoding/sense amplifiers 53, and a plurality of output terminals coupled to the second plurality input terminals of data output buffer/amplifier 57.

In the illustrated embodiment, address signals ADDRESS includes a 32 bit address generated by a data processor (not shown) and is provided to cache memory 20. The 32-bit address includes bit numbers 0–31. A bit field including bits numbered 0–4 are for byte select and the burst addresses used by cache control logic 37. A bit field including bits numbered 5–15 function as an index for selecting a word line and bit line pair in a memory block. Bits 5, 6, 10–15 select the word line, and bits 7, 8, and 9 select the bit line pair. A bit field including bits numbered 16–31 function as the TAG address field for comparison by comparator 36. For purposes of describing the invention, the particular number of bits and the address bit field organization are not significant, and may be different in other embodiments.

During a read operation of cache memory 20, address signals ADDRESS selects a memory cell to be read, for example memory cell 41. Data is provided by memory cell 41 to bit line pair BL/BL*, in the form of a differential voltage between the bit lines of the bit line pair. Sense amplifiers in column logic/sense amplifiers 53 senses and amplifies the differential voltage and provides the differential voltage to data output buffer/amplifier 57 or to cast output buffer 55. Note that for purposes of describing the invention, data includes both data and instructions.

During a write operation of cache memory 20, address signals ADDRESS select the memory cell to be written to, and data is provided to write column logic 47 through data in latch 45. A selected bit line pair, for example bit line pair BL/BL*, receives the data in the form of a differential voltage, and provides the differential voltage to a memory cell that is coupled to the selected word line and bit line pair. The differential voltage provided to the bit line pair overwrites, if necessary, the data stored in the selected memory cell.

During both read and write operations, data may be "burst" from or to cache memory 20. A base address, or starting address, is supplied to cache memory 20. After the data located at the base address is accessed, a binary counter (not shown) increments the base address and an access for a read or a write occurs at the incremented address. The bursts occur in consecutive cycles of cache memory 20 and allows an entire line of memory to be read or written quickly. A line is a predetermined number of bits to be transferred from a lower level memory to cache memory 20, and corresponds to the number of bits accessed by the stored TAG address. The transaction is complete when the binary counter increments the address a predetermined number of times.

If an access to cache memory 20 results in a miss, and a selected way contains dirty, or modified, data a read-modify-write operation is used to read the dirty data from the selected way to a cast out buffer and new data is written to the selected way. Cache control logic 37 arbitrates for bus mastership with the data processor (not shown), and provides the read data to main memory (not shown), or to a lower level memory. New data is then written into the selected way. The selected way for the write operation is typically determined using a least recently used (LRU) algorithm.

During a read-modify-write operation of the illustrated embodiment, read and write operations take place simultaneously on different columns within a memory block. This is accomplished during a read-modify-write operation by using separate column decoding signals for the read operation and for the write operation, and by delaying write column decode signals WCP(0:3) by one clock cycle from read column decode signals RCP(0:3). Write column decode signals WCP(0:3) select the same memory locations as read column decode signals RCP(0:3), but are delayed by one clock cycle. Data is burst into and out of cache memory 20 during the read-modify-write operation. One clock cycle after the first word of a 4 word burst read operation, during the second word of the burst read operation, the first word of a 4 word burst write operation is written to the same address as the first word of the burst read operation. About the same time that the third read burst occurs, the second write burst to the third read burst location takes place, and so on. The row address portion of the address does not change during the read-modify-write operation.

Using write column logic 47 to receive the write column address and read column decoder 51 to receive the read column address allows data to be written to a memory block at the same time that data is read from the memory block. Data in a memory block can be replaced in almost half the time required to first burst the read data and then burst the write data, as is done in prior cache systems. Power consumption of memory 20 is reduced because the same bit line is not first driven with invalid data before valid data is available.

Because of a potential problem regarding capacitive coupling between adjacent bit line pairs, a read operation and a write operation should not occur simultaneously on adjacent bit line pairs. Performing a write operation on a bit line pair that is adjacent to a bit line pair being read may cause the data on the bit line pair being read to change logic states due to the capacitive coupling. The architecture may be easily changed to reduce the effect of capacitive coupling by interleaving the bit line pairs of one way with those of another way. Interleaved bit lines are common in memories to reduce the effect of capacitive coupling.

Figure 3:
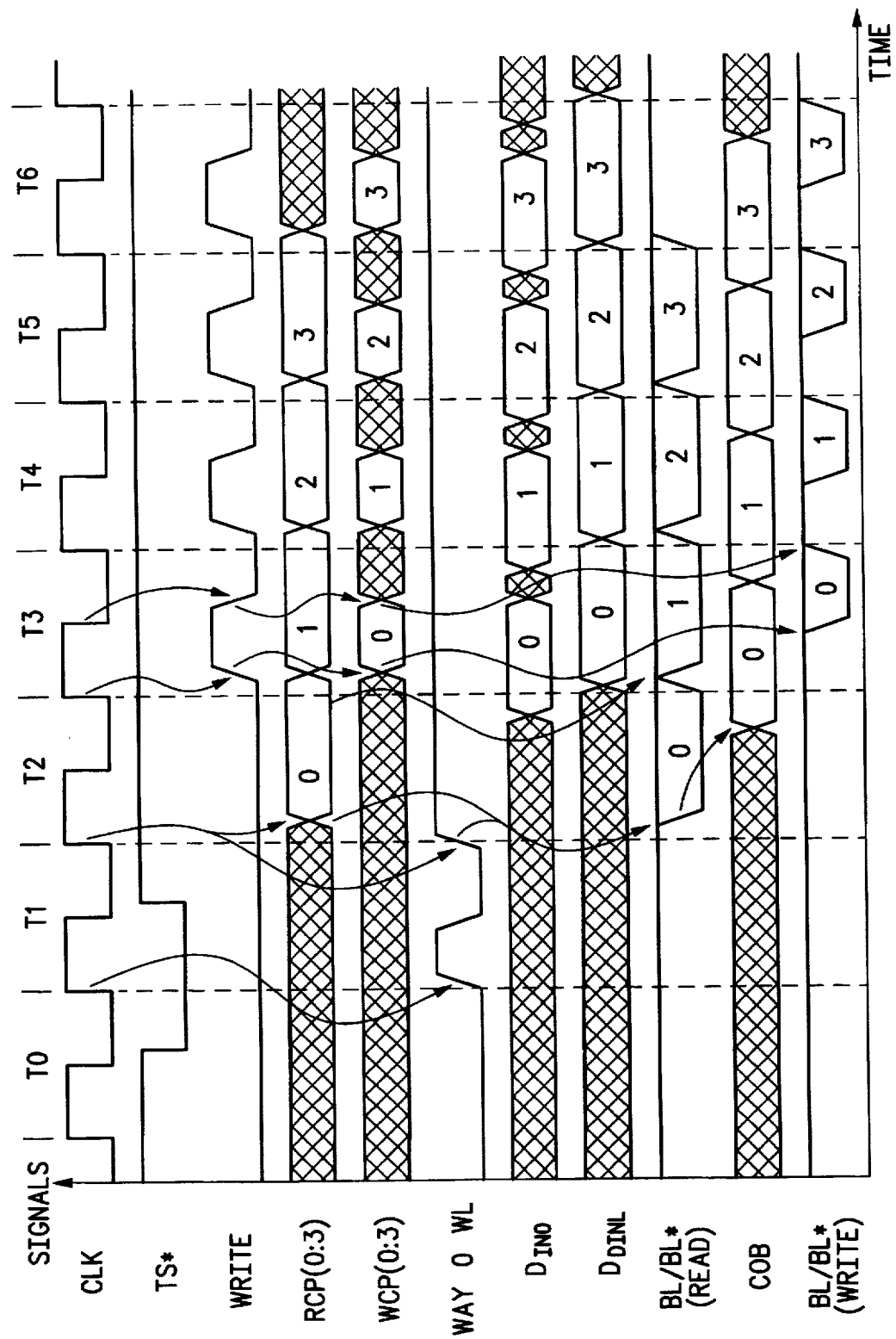
FIG. 3 illustrates a timing diagram of various signals during a read-modify-write operation of the cache memory of FIG. 1 in accordance with one embodiment of the present invention.

FIG. 3 illustrates a timing diagram of various signals during a read-modify-write operation of the cache memory of FIG. 1 in accordance with an embodiment of the present invention. Note that the timing diagram of FIG. 3 is not drawn to scale and does not represent relative voltage levels of the various signals. Also, note that the clock signal is divided into cycles, and each cycle is labeled uniquely by "T" followed by a number. Seven cycles of clock signal CLK, labeled "T0" through "T6" are illustrated in FIG. 3. A signal is invalid, or unresolved, during signal portions that are cross-hatched.

A read-modify-write operation is initiated in cache memory 20 when it is determined that all of the ways selected for replacement contain dirty data. Dirty data is burst from the selected way and new data is burst to the selected way until data in an entire line of memory is replaced. The timing diagram of FIG. 3 illustrates a read-modify-write operation of way 22 (WAY 0), with block 25 receiving new data. The timing diagram also applies if any of the other ways were chosen for the read-modify-write operation.

During clock cycle T0 of the read-modify-write operation, transfer start signal TS* is asserted as a logic low by a data processor to begin an access to cache memory 20. Write enable signal WRITE is a logic low, indicating that dirty data is to be read from memory array 40. At clock cycle T1, a word line in way 0, labeled in FIG. 3 as "WAY 0 WL", is momentarily asserted as a logic high voltage and then returns to a logic low, indicating a miss in way 0. Misses in each of the other ways also cause a momentary assertion of a logic high word line signal in each of the ways (not shown in FIG. 3).

At the beginning of clock cycle T2, read column decode signals RCP(0:3) select the first bit line pair to be read, for example, bit line pair BL/BL* (READ). A differential data signal is provided to the first bit line pair by the memory cell that is selected by logic high word line WAY 0 WL. Column decode signals RCP(0:3) are incremented by a counter in cache control logic 37 to the next column address to be read, (labeled with a "1" in FIG. 3) and the data contained at the memory cell coupled to a second bit line pair and to word line WAY 0 WL is read. The read data is provided to cast out buffer 55. Cast out buffer 55 receives the read data and provides the read data to buffer/amplifier 57. Bit line pair signals BL/BL* (READ) and cast out buffer signals COB are numbered consecutively to correspond to the appropriate read column decode signals RCP(0:3).

After the first read, write enable signal WRITE is asserted as a logic high voltage by cache control logic 37, causing a first write operation to the first selected bit line pair. The first write operation occurs during the same time interval as the second read operation. Data in signals $D_{IN0}$ are written to the first bit line pair by write column decode signals WCP(0:3). Note that the resolved data in signals $D_{INO}$, latched data in signals $D_{INL}$, and bit line pairs BL/BL* (WRITE) are numbered with 0–3 to correspond with appropriate write column decode signals WCP(0:3) having the same numbers 0–3. During the first write operation, write column decode signals WCP(0:3) select the same bit line loads 49 to overwrite the dirty data stored in the memory cell coupled to word line WAY 0 WL. After the first write, three more writes are burst in sequence as write column decode signals WCP (0:3) are incremented. The transaction is complete when all of the dirty data in a line is replaced with new data.

The use of separate read and write column decoders allows simultaneous read and write operations to be performed in cache memory 20 during a burst read-modify-write operation. The simultaneous read and write operations are performed on different bit line pairs in the same memory block. The read operation is started, and one clock cycle later, the write operation is started. The one clock cycle delay causes the first write operation to occur at the same time as the second read operation. Four words are burst during each of the write and read operations. By using separate read and write column decoders, a read-modify-write operation of a block of data can be accomplished in less time than previous methods.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

what is claimed is:

1. A cache memory, comprising:
    a plurality of memory cells, a memory cell of the plurality of memory cells connected to only one word line and to a bit line, wherein the bit line is for both and reading to the memory cell, and wherein the memory cell is accessed for both writing to and reading from the memory cell solely by selecting the only one word line;
    a word line decoding circuit coupled to the plurality of memory cells, for selecting a word line in response to an address;
    write column decoding logic, coupled to the bit lines of the plurality of memory cells, for writing first data to memory cells of the plurality of memory cells that are connected to the selected word line; and
    read column decoding logic, coupled to the bit lines of the plurality of memory cells, for reading second data from the memory cells of the plurality of memory cells that are connected to the selected word line;
    wherein during a read-modify-write operation the second data is burst from the cache memory starting from the location corresponding to the address, and the first data is burst to the cache memory starting from the location corresponding to the address, and wherein a portion of the burst from the cache memory overlaps in time with a portion of the burst to the cache memory.

2. The cache memory of claim 1, wherein the plurality of memory cells are characterized as being a plurality of static random access memory cells.

3. The cache memory of claim 1, wherein the plurality of memory cells are arranged in a plurality of ways, a way of the plurality of ways comprising a plurality of blocks of memory cells.

4. The cache memory of claim 1, further comprising:
    a TAG array of memory cells for storing a TAG address corresponding to data stored in the plurality of memory cells;
    a comparator, coupled to the TAG array, for comparing the TAG address to an input address, and providing a match signal when the TAG address matches the input address; and
    cache control logic for receiving a clock signal and a start transfer control signal, and in response, controlling the cache memory.

5. The cache memory of claim 1, wherein a beginning of the second data burst from a portion of a line of the cache memory occurs one clock cycle before a beginning of the first data burst to the portion of the line of the cache memory.

6. A cache memory, comprising:
    a plurality of memory cells arranged in rows and columns, each memory cell of a row being connected to only one word line and to a bit line, wherein the bit line is for both writing and reading to the memory cell, and wherein the memory cell is accessed for both writing to and reading from the memory cell solely by selecting the only one word line;
    a word line decoding circuit coupled to the plurality of memory cells, for selecting a word line in response to an address; and
    column decoding logic, coupled to the plurality of memory cells, for selecting a portion of the plurality of memory cells that are connected to the selected word line, and for sequentially reading, in first consecutive clock cycles, first data from the portion of the plurality of memory cells, the column decoding logic for sequentially writing, in second consecutive clock cycles, second data to the portion of the plurality of memory cells, wherein during a read-modify-write operation of the cache memory, at least one clock cycle of the first consecutive clock cycles and at least one clock cycle of the second consecutive clock cycles occurs substantially simultaneously.

7. The cache memory of claim 6, wherein the column decoding logic comprises:
    write column decoding logic, coupled to the plurality of memory cells, for selecting the portion of the plurality of memory cells and writing the second data to the portion of the plurality of memory cells; and
    read column decoding logic, coupled to the plurality of memory cells, for selecting the portion of the plurality of memory cells, and reading the first data from the portion of the plurality of memory cells.

8. The cache memory of claim 7, wherein the plurality of memory cells are characterized as being a plurality of static random access memory cells.

9. The cache memory of claim 8, wherein the plurality of memory cells are arranged in a plurality of ways, a way of the plurality of ways comprising a plurality of blocks of memory cells.

10. The cache memory of claim 9, further comprising:
    a TAG array of memory cells for storing a TAG address corresponding to data stored in the plurality of memory cells;
    a comparator, coupled to the TAG array, for comparing the TAG address to an input address, and providing a match signal when the TAG address matches the input address; and
    cache control logic for receiving a clock signal and a start transfer control signal, and in response, controlling the cache memory.

11. The cache memory of claim 10, wherein the first data is burst from the plurality of memory cells and the second data is burst to the plurality of memory cells.

12. In a set associative cache memory having a cache memory array and a TAG array, the cache memory array having a plurality of ways, each of the plurality of ways having a plurality of memory cells organized as rows and columns, each memory cell of a row being connected to only one word line and an access to the memory cell for both reading and writing to the memory cell is solely by selecting the only one word line, a method for performing a read-modify-write operation, the method comprising the steps of:

accessing the cache memory array at an address;

determining that a cache miss has occurred when the address does not match any of a plurality of TAG addresses, the plurality of TAG addresses corresponding to data stored in the cache memory array;

selecting a way of the plurality of ways in the cache memory array for the read-modify-write operation;

selecting a word line;

sequentially reading data from memory cells connected to the word line in the way in a first number of consecutive clock cycles; and sequentially writing new data to the memory cells connected to the word line in the way in a second number of consecutive clock cycles;

wherein the step of sequentially reading data and the step of sequentially writing new data are performed during a same time interval and at least one clock cycle of the first number of consecutive clock cycles occurs substantially simultaneously with at least one clock cycle of the second number of consecutive clock cycles.

13. The method of claim 12, wherein the step of sequentially reading data from the memory cells further comprises providing the data to a cast out buffer.

14. The method of claim 12, wherein the step of accessing the cache memory array comprises accessing the cache memory array for a write operation.

15. The method of claim 12, wherein the step of selecting a way of the plurality of ways comprises selecting a way using a least-recently-used algorithm.

16. The method of claim 12, further comprising a step of determining that the data stored in all of the plurality of ways is dirty.

* * * * *

UNITED STATES PATENT AND TRADEMARK OFFICE
CERTIFICATE OF CORRECTION

PATENT NO. : 5,802,586
DATED : September 1, 1998
INVENTOR(S) : Kenneth W. Jones et al.

It is certified that error appears in the above-identified patent and that said Letters Patent is hereby corrected as shown below:

In Claim 1, Column 7, Line 38;
    after "both", add - -writing- -.

Signed and Sealed this

Twelfth Day of January, 1999

Attest:

Attesting Officer    *Acting Commissioner of Patents and Trademarks*